United States Patent (10) Patent No.: US 12,233,974 B2
Laine et al. (45) Date of Patent: Feb. 25, 2025

(54) METHOD FOR CONTROLLING STEERING OF A VEHICLE ARRANGEMENT

(71) Applicant: Volvo Truck Corporation, Gothenburg (SE)

(72) Inventors: Leo Laine, Härryda (SE); José Vilca, Gothenburg (SE); Rebecka Villiamsson, Västra Frölunda (SE)

(73) Assignee: Volvo Truck Corporation, Gothenburg (SE)

( * ) Notice: Subject to any disclaimer, the term of this patent is extended or adjusted under 35 U.S.C. 154(b) by 238 days.

(21) Appl. No.: 18/019,111

(22) PCT Filed: Aug. 24, 2020

(86) PCT No.: PCT/EP2020/073631
§ 371 (c)(1),
(2) Date: Feb. 1, 2023

(87) PCT Pub. No.: WO2022/042818
PCT Pub. Date: Mar. 3, 2022

(65) Prior Publication Data
US 2023/0278625 A1 Sep. 7, 2023

(51) Int. Cl.
*B62D 9/00* (2006.01)
*B60L 15/20* (2006.01)
*B62D 5/04* (2006.01)

(52) U.S. Cl.
CPC .......... *B62D 9/002* (2013.01); *B60L 15/2036* (2013.01); *B62D 5/0418* (2013.01); *B60L 2240/24* (2013.01); *B60L 2240/461* (2013.01)

(58) Field of Classification Search
CPC ........ B62D 9/002; B62D 5/0418; B62D 5/04; B62D 5/06; B60L 15/2036;
(Continued)

(56) References Cited

U.S. PATENT DOCUMENTS 9,145,169 B2 * 9/2015 Suh .................. B62D 9/002
9,393,993 B2 * 7/2016 Nishikawa ............ B60W 30/09
(Continued)

FOREIGN PATENT DOCUMENTS

CN 110254420 A 9/2019
DE 102010007630 A1 8/2010
(Continued)

OTHER PUBLICATIONS

International Search Report and Written Opinion for International Patent Application No. PCT/EP2020/073631, mailed May 19, 2021, 12 pages.
(Continued)

*Primary Examiner* — Hai H Huynh
(74) *Attorney, Agent, or Firm* — Withrow & Terranova, PLLC (57) ABSTRACT

The present disclosure relates to a method for controlling steering of a vehicle arrangement. The method is controlling steering of the vehicle arrangement during a turning maneuver, by applying a differential wheel speed by at least one of individually controllable electric machines and reducing the operational capacity of a power steering system, when a first power utilization value, obtained by operating the individually controllable electric machines with the differential wheel speed, is equal to, or greater than a second power utilization value, obtained by operating the power steering system during the turning maneuver.

17 Claims, 7 Drawing Sheets

(58) Field of Classification Search
CPC .......... B60L 2240/24; B60L 2240/461; Y02T 10/64; Y02T 10/72; B60Y 2200/91
USPC ...................................... 701/41, 42, 43, 44
See application file for complete search history.

(56) References Cited

U.S. PATENT DOCUMENTS

| | | | |
|---|---|---|---|
| 10,562,400 B2* | 2/2020 | Ryu | B62D 7/22 |
| 11,752,999 B2* | 9/2023 | Takahara | B60W 10/188 |
| | | | 701/44 |
| 11,891,047 B2* | 2/2024 | Laine | B60W 40/114 |
| 2015/0175203 A1 | 6/2015 | Suh et al. | |
| 2019/0111803 A1 | 4/2019 | Ryu | |

FOREIGN PATENT DOCUMENTS

| | | |
|---|---|---|
| DE | 102014200608 A1 | 7/2015 |
| EP | 2746125 A1 | 6/2014 |
| EP | 3511226 A1 | 7/2019 |

OTHER PUBLICATIONS

Decision of Rejection for Japanese Patent Application No. 2023511861, mailed Jul. 12, 2024, 10 pages.
Reasons for Rejection for Japanese Patent Application No. 2023511861, mailed Mar. 1, 2024, 7 pages.

* cited by examiner

METHOD FOR CONTROLLING STEERING OF A VEHICLE ARRANGEMENT

This application is a 35 USC 371 national phase filing of International Application No. PCT/EP2020/073631, filed Aug. 24, 2020, the disclosure of which is incorporated herein by reference in its entirety.

TECHNICAL FIELD

The present disclosure relates to a method for controlling steering of a vehicle arrangement. The present disclosure also relates to a control unit connectable to such a vehicle arrangement. The method and control unit are applicable for vehicles, preferably electric vehicles, and more preferably electric front axle propelled vehicles. The electric machines could also be positioned on e.g. a steered pusher or tag axle. Although the method and control unit will mainly be described in relation to a truck using electric machines, it may also be applicable for other types of vehicles.

BACKGROUND

In the field of vehicle, in particularly low-, medium- and heavy-duty vehicles commonly referred to as trucks, there is a continuous development with regards to various control functionalities of the vehicle. In particular, the control functionalities intend to improve the drivability of the vehicle, the comfort for the driver, and the safety during operation.

One control functionality that is generally always under improvement is the steering of the vehicle. There is a continuous development in this particular technical field with regards to autonomous steering systems, steer-by-wire systems, etc. In particular, these types of steering systems continuously struggle with the problem of controlling the vehicle to follow the road curvature as desired. An autonomous steering system may for example base its steering on detected curvatures ahead of the vehicle. The steer-by-wire system bases its steering on input from either a human operator or an autonomous function.

One particular problem is that for some steering operation system the vehicle power consumption is relatively high. Another problem is that malfunctioning steering system increases the risk of traffic accidents due to e.g. vehicle crashes as the steering system is not functioning as intended.

There is thus a desire to further improve vehicle steering operation to reduce the energy consumption, as well as improving the steering redundancy.

SUMMARY

It is an object of the present disclosure to describe a method which at least partially overcomes the above described deficiencies. This is achieved by a method according to claim 1.

According to a first aspect, there is provided a method for controlling steering of a vehicle arrangement, the vehicle arrangement comprising a power steering system for steer control of a pair of steerable wheels arranged on a left- and right-hand side of the vehicle arrangement; wherein each of the steerable wheels comprises an individually controllable electric machine for propelling the vehicle arrangement, the method comprising the steps of determining a required steering angle for operating the vehicle arrangement during a turning maneuver; determining, for the individually controllable electric machines, a differential wheel speed required for obtaining the required steering angle; determining a first power utilization value of the vehicle arrangement obtained by operating the individually controllable electric machines with the differential wheel speed; determining a second power utilization value of the vehicle arrangement obtained by operating the power steering system to obtain the steering angle; comparing the first power utilization value with the second power utilization value; and controlling steering of the vehicle arrangement during the turning maneuver, by applying the differential wheel speed using at least one of the individually controllable electric machines and reducing the operational capacity of the power steering system, when the first power utilization value is equal to, or greater than the second power utilization value.

The wording "vehicle arrangement" should be construed as any part of a complete vehicle having steerable wheels. The vehicle arrangement may thus, for example, relate to a towing vehicle including the vehicle cab (if such cab is present), the towed vehicle, and/or a dolly comprising steerable wheels. The steerable wheels can thus be arranged on e.g. the front steerable axle. The steerable wheels can also be arranged on a so-called pusher axle or a tag axle of the vehicle. It should however be readily understood that the vehicle arrangement of the present disclosure does not need to use a steerable mechanical axle at all, the individually controllable electric machines can be connected to the steerable wheels without the use of a mechanical axle/shaft.

The power steering system should be construed as a steering system of the vehicle which is arranged to turn the steerable wheels. As will also be described below, the power steering system may be a hydraulically controlled steering system, a pneumatically controlled steering system or a steer-by-wire steering system. The power steering system may thus be controlled by an operator of the vehicle, i.e. a vehicle driver, or autonomously controlled.

Furthermore, the differential wheel speed of the individually controllable electric machines should be construed such that one of the individually controllable electric machines operates at a different speed compared to the other individually controllable electric machine. The differential wheel speed may be obtained based on speed control and/or by torque control. The differential wheel speed may be a calculated/determined differential wheel torque of the individually controllable electric machines, or from a difference in wheel slip between the pair of wheels. Also, the differential wheel speed may be obtained by controlling solely one of the wheels or controlling both of the wheels. This will be described in further detail below in relation to the detailed description. Accordingly, when operating the individually controllable electric machines at different speeds, the vehicle will operate a turning maneuver.

Still further, the wording "power utilization value" should be construed as a utilization of the required overall power of the vehicle during a turning maneuver. Thus, a higher power utilization corresponds to a lower energy consumption. When controlling steering of the vehicle by means of the individually controllable electric machines, various functionalities associated with the power steering system can be turned off when reducing the operational capacity of the power steering system, whereby the energy consumption can be reduced and thereby the first power utilization value can be increased. Various alternatives for increasing the first power utilization value will be described below, as well as embodiments for determining that the first power utilization value is higher than the second power utilization value.

The wording "reducing the operational capacity of the power steering system" should be construed such that the power steering system is not the major contributor to the steering of the vehicle, which is instead primarily handled by operation of the individually controllable electric machines. According to an example embodiment, the power steering system may be deactivated during the step of reducing its operational capacity. Hereby, the power steering system is completely turned off.

Moreover, it should also be readily understood that the individually controllable electric machines may each operate both as an electric motor for propelling the vehicle, or as an electric generator for generating electric power. As the electric machines are individually controlled, a driving mode of the vehicle may operate one of the electric machines as an electric motor while the other one is operated as an electric generator.

An advantage of the above described method is that an improved redundancy of the steering functionality of the vehicle arrangement is achieved. In detail, the method enables for triple redundancy, i.e. steering can be controlled by either the power steering system, one of the individually controllable electric machines or both of the individually controllable electric machines. Hence, proper steering can be obtained even if one of the individually controllable electric machines, as well as the power steering system malfunctions.

A further advantage is that steering of the vehicle arrangement will operate in the most energy efficient manner. The inventors of the present disclosure have realized that by comparing the first and second power utilization values, an overall reduction in energy/power consumption is achieved. The inventors have also unexpectedly realized that various control functionalities, such as e.g. hydraulic systems, pneumatic systems, etc. associated with the power steering system can be at least partly deactivated when controlling steering using the individually controllable electric machines. Hereby, steering of the vehicle arrangement may to a larger extent be controlled using the individually controllable electric machines, and less frequently by using the power steering system.

According to an example embodiment, the method may further comprise the steps of determining if the vehicle is able to operate the turning maneuver with the required steering angle by controlling at least one of the individually controllable electric machines; and determining that the first power utilization value is greater than the second power utilization value when being able to operate the vehicle with the required steering angle using at least one of the individually controllable electric machines.

It has been realized that in the majority of operating scenarios, it is more beneficial to control steering by operation of the individually controlled electric machines compared to operation using the power steering system. Thus, the first power utilization value is, in this example embodiment, determined to be greater than the second power utilization value when the road curvature can be handled solely using the individually controlled electric machines.

According to an example embodiment, the individually controllable electric machines may be electrically connected to an electrical power supply, wherein the step of determining the first power utilization value comprises the steps of receiving a signal indicative of a current state of charge level for the electrical power supply; determining, based on the current state of charge level, an electrical power level regenerable by at least one of the individually controlled electric machines during the turning maneuver; and determining the first power utilization value at least in part on the regenerable electrical power level.

The electrical power supply may, for example be a battery. By regenerating electrical power when operating the vehicle, the power utilization can be determined to be reduced. Thus, the overall energy consumption of the vehicle arrangement will be reduced as electric power is regenerated. Regenerating electrical power may thus be a parameter contributing to the reduction in energy consumption, i.e. increasing the first power utilization value.

According to an example embodiment, steering of the vehicle arrangement may be controlled by operating the at least one individually controlled electric machine to regenerate electrical power when the current state of charge level is below a predetermined threshold level. Hence, the electrical power supply is hereby able to be charged with electrical power.

According to an example embodiment, the method may further comprise the step of receiving a signal indicative of a deceleration during the turning maneuver; and operating the at least one electric machine to regenerate electrical power when the vehicle will decelerate during the turning maneuver.

The deceleration level can thus set the level of power regeneration during the turning maneuver. In turn, the level of electrical power regeneration can be used as a parameter for determining the first power utilization value. In general, the power utilization value is increased when increasing the level of electrical power regeneration.

According to an example embodiment, steering of the vehicle may be controlled by operating one of the individually controlled electric machines to regenerate electrical power, and operating the other one of the individually controlled electric machines to increase the wheel speed during the turning maneuver. Hereby, the vehicle can be controlled during the turning maneuver to be both propelled by an electric machine as well as to regenerate electrical power with another electric machine.

According to an example embodiment, the method may further comprise the steps of determining a desired acceleration level for operating the vehicle arrangement during the turning maneuver; determining a wheel friction value for each of the steerable wheels, the wheel friction value being a friction value between the wheel and a road surface; and controlling the differential wheel speed based on the desired acceleration level and the wheel friction values.

The wheel friction value between the wheel and the road surface may be determined by, e.g. sensors or similar arrangement arranged in connection to the wheel brake system, etc. The wheel friction value is thus preferably a parameter used for determining the steering capability when operating the individually controlled electric machines during the turning maneuver.

In particular, the wheel friction value can be estimated by estimating the electric machine torque for the respective wheel. Hereby, the wheel force can be determined. By estimating the wheel speed and vehicle speed, the wheel slip can be determined. The wheel slip and the wheel force can then be used for determining the friction level.

As an alternative, the wheel slip can be set at a limit value, whereby the friction level is not necessary to be determined. In such case, the applied torque is set to not generate a slip value above a predetermined slip level.

According to an example embodiment, the desired acceleration level may be determined based on an input signal indicative of a position of an acceleration pedal. However, and according to another example embodiment, the desired acceleration level may be determined based on a desired vehicle speed and an upcoming road trajectory.

According to an example embodiment, the method may further comprise the steps of determining a desired vehicle speed during the turning maneuver; determining a differential wheel speed for steering the vehicle at the desired vehicle speed during the turning maneuver; comparing the differential wheel speed with a maximum available differential wheel speed obtainable by the individually controllable electric machines; and controlling steering of the vehicle arrangement during the turning maneuver, by applying a differential wheel speed by the individually controllable electric machines and activating the power steering system, for obtaining a desirable steering radius and vehicle speed.

Hereby, the turning maneuver can be controlled by operating the at least one individually controllable electric machines as well as the power steering system. This driving scenario is beneficial for operating conditions where the individually controllable electric machines are unable to solely operate the vehicle as desired in a curvature.

According to an example embodiment, the method may further comprise the steps of determining a desired deceleration level of the vehicle arrangement during the turning maneuver; determining a maximum available deceleration level obtainable by the individually controllable electric machines; and applying a service brake of the vehicle arrangement during the turning maneuver when the maximum available deceleration level is lower compared to the desired deceleration level.

Using the service brake during the turning maneuver is thus a further redundancy of the system, when the individually controllable electric machines are determined not be able to sufficiently reduce the vehicle speed without brake assistance. This driving scenario may also be beneficial when the state of charge level of the electrical power supply is above the predetermined threshold level.

According to an example embodiment, steering of the vehicle arrangement may be controlled by applying the differential wheel speed by the individually controllable electric machines and reducing the operational capacity of the power steering system when the vehicle speed is above a predetermined speed threshold level. The vehicle speed may thus be used as a parameter for determining that the first power utilization value is greater than the second power utilization value.

According to an example embodiment, the power steering system may be one of a hydraulically controlled steering system, a pneumatically controlled steering system or a steer-by-wire steering system.

According to a second aspect, there is provided a control unit connectable to a vehicle arrangement comprising a pair of steerable wheels arranged on a left- and right-hand side of the vehicle arrangement, power steering system for steer control of the pair of steerable wheels; wherein each of the steerable wheels comprises an individually controllable electric machine for propelling the vehicle arrangement, wherein the control unit is electrically connectable to the pair of steerable wheels and the power steering system, the control unit being configured to determine a required steering angle for operating the vehicle arrangement during a turning maneuver; determine, for the individually controllable electric machines, a differential wheel speed required for obtaining the required steering angle; determine a first power utilization value of the vehicle arrangement obtained by operating the individually controllable electric machines with the differential wheel speed; determine a second power utilization value of the vehicle arrangement obtained by operating the power steering system to obtain the steering angle; compare the first power utilization value with the second power utilization value; and when the first power utilization value is equal to, or greater than the second power utilization value, the control unit is further configured to transmit a control signal to the individually controllable electric machines, the control signal being indicative of applying the differential wheel speed; and transmit a control signal to the power steering system for reducing the operational capacity thereof.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

Effects and features of the second aspect are largely analogous to those described above in relation to the first aspect. Thus, each embodiment of the first aspect is combinable with the features of the second aspect.

According to a third aspect, there is provided a computer program comprising program code means for performing the steps of any one of the embodiments described above in relation to the first aspect when the program is run on a computer.

According to a fourth aspect, there is provided a computer readable medium carrying a computer program comprising program means for performing the steps of any one of any one of the embodiments described above in relation to the first aspect when the program means is run on a computer.

Effects and features of the third and fourth aspects are largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features and advantages, will be better understood through the following illustrative and non-limiting detailed description of exemplary embodiments, wherein.

DETAILED DESCRIPTION

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference character refer to like elements throughout the description.

Figure 1:
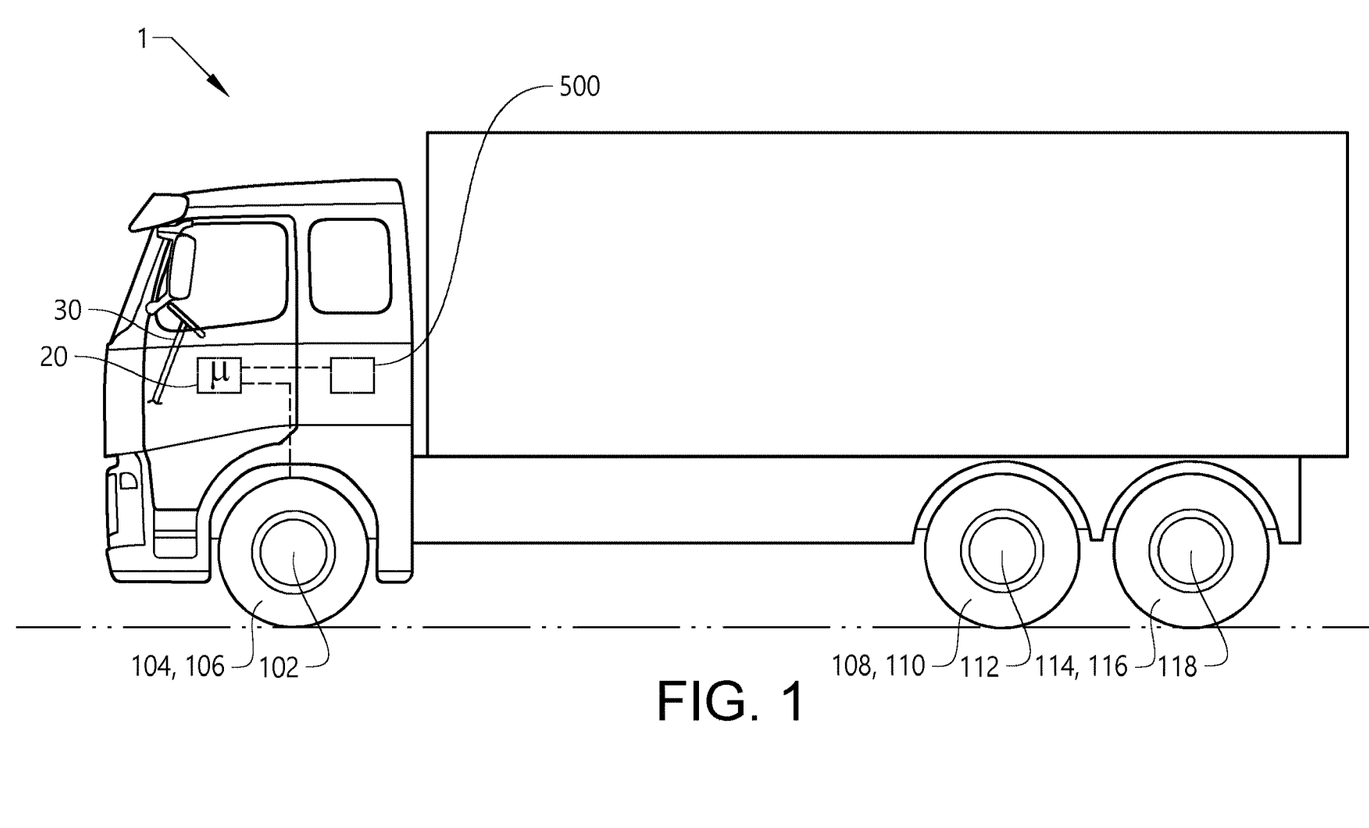
FIG. 1 is a lateral side view illustrating an example embodiment of a vehicle in the form of a truck.

With particular reference to FIG. 1, there is provided a vehicle 1 in the form of a truck. The vehicle 1 comprises a control unit 20, and a steering system 500. It should however be understood that the steering system 500 may be arranged as a control unit. Thus, no separate control unit 20 may in such case be superfluous. The vehicle 1 comprises a pair of steerable wheels 104, 106 arranged on a respective left- and right-hand side of a front axle 102 of the vehicle. The front axle 102 is thus the foremost located axle of the vehicle 1. The vehicle 1 depicted in FIG. 1 also comprises a pair of first rear wheels 108, 110 connected to a first rear axle 112, and a pair of second rear wheels 114, 116 connected to a second rear axle 118. The first rear axle 112 is arranged in front of the second rear axle 118 as seen in the longitudinal direction of the vehicle 1. As will also be described below with reference to FIG. 2, the pair of first rear wheels 108, 110 and/or the pair of second rear wheels 114, 116 can also be arranged as steerable wheels. As is also depicted, the vehicle 1 comprises a power steering system 30. The power steering system 30 is preferably arranged as a redundant steering system for steer control of the steerable wheels. Although FIG. 1 illustrates the power steering system 30 including a steering wheel, the power steering system 30 may instead form part of a steer-by-wire system, etc.

Figure 2:
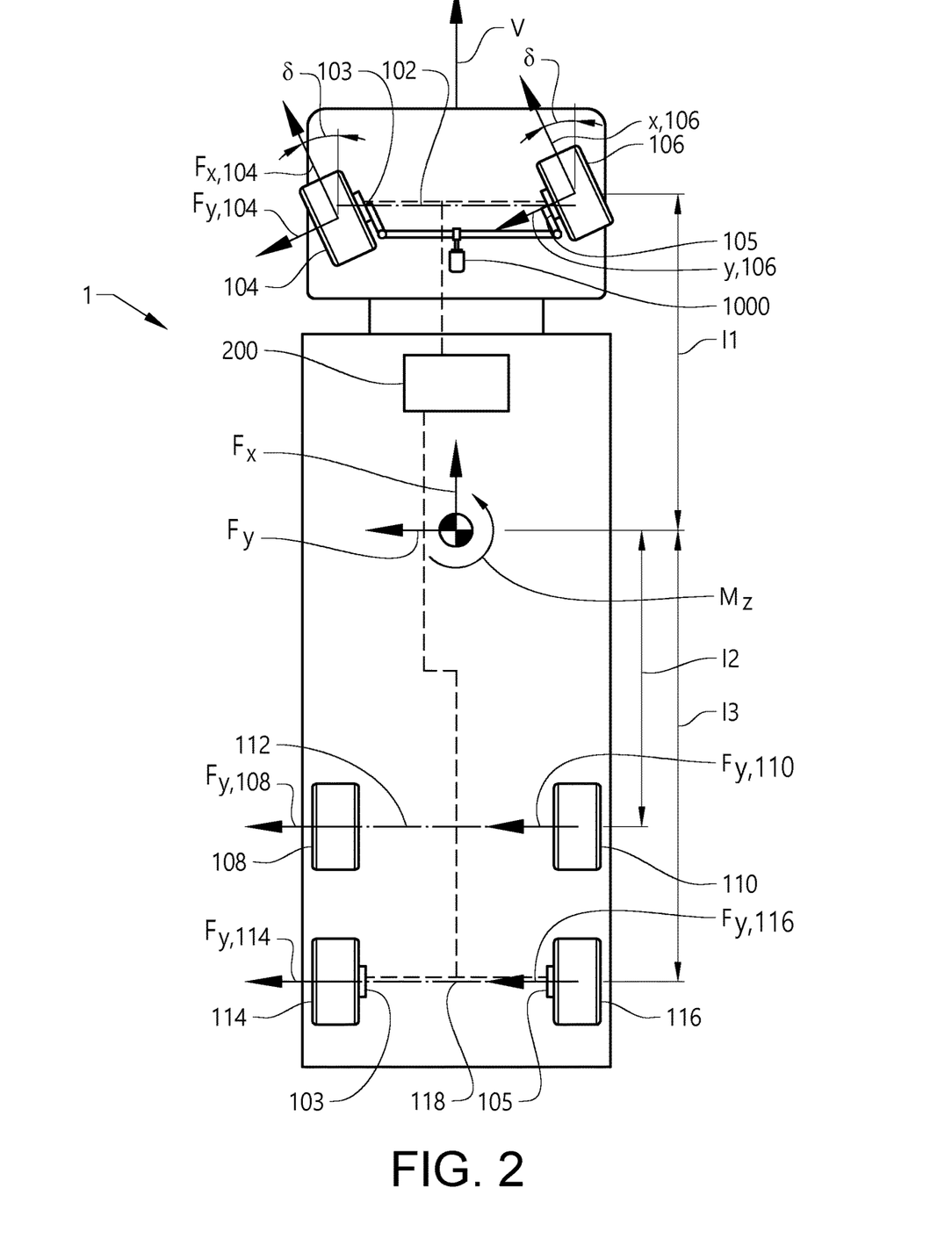
FIG. 2 is a schematic illustration from above depicting the vehicle in FIG. 1 exposed to a turning maneuver according to an example embodiment.
Figure 3:
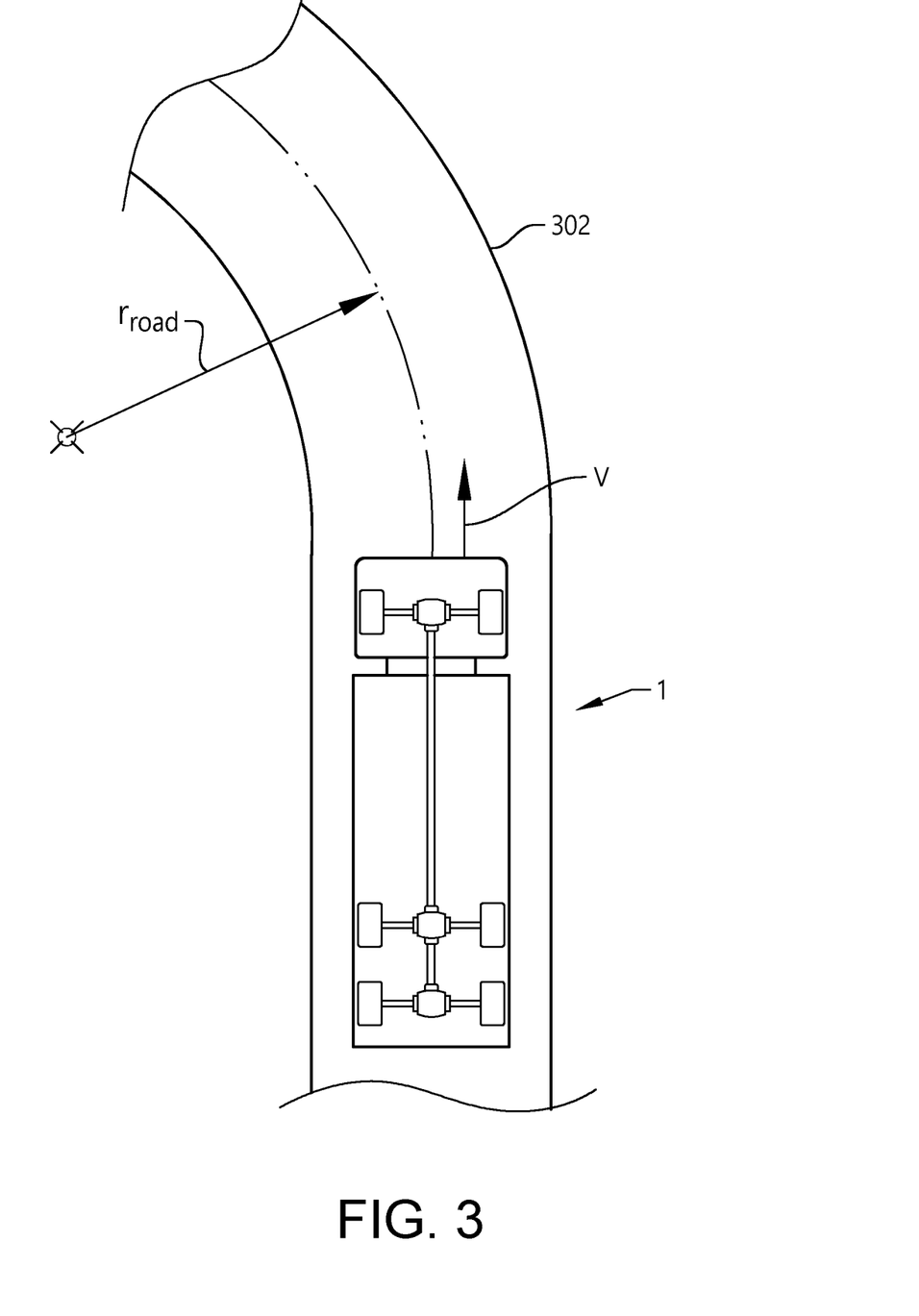
FIG. 3 illustrates the vehicle in FIG. 1 before entering a curvature of the road.

In order to describe the vehicle 1 in further detail, reference is made to FIGS. 2 and 3. In detail, FIG. 2 illustrates an example embodiment of the forces exposed to the vehicle 1 and its wheels during a turning maneuver, and FIG. 3 illustrates the vehicle 1 before initiating a turning maneuver, i.e. before arriving at a road curvature.

Starting with FIG. 2, which is a schematic illustration from above depicting the vehicle 1 in FIG. 1 exposed to a turning maneuver according to an example embodiment. Hence, the pair of steerable wheels 104, 106 is turning and being exposed to a steering angle $\delta$. The steering angle $\delta$ is for simplification in FIG. 2 illustrated as the same for the left 104 steerable wheel and the right 106 steerable wheel and is an angle of the wheels relative to a longitudinal axis of the vehicle 1. The vehicle is operated at a vehicle speed indicated as v. The steerable wheels 104, 106 also comprises a respective individually controllable electric machine 103, 105. As described above, the pair of first rear wheels 108, 110 and/or the pair of second rear wheels 114, 116 can also be arranged as steerable wheels. In FIG. 2, the pair of second rear wheels 114, 116 are depicted as steerable and thus also comprises a respective individually controllable electric machine 103, 105. The first rear axle 112 can thus be arranged as a steerable pusher axle and the second rear axle 118 can be arranged as a steerable tag axle. However, the following will for simplicity only describe steering using the front steerable wheels. Also, in FIG. 2, the power steering system is illustrated as an electrical power steering system 1000.

As also depicted in FIG. 2, the individually controllable electric machines 103, 105 are connected to an electrical power supply 200 for receiving electric power. The electrical power supply 200 is also arranged to transmit electrical power to the individually controllable electric machines 103, 105. The electrical power supply 200 is thus preferably arranged as a vehicle battery. The individually controllable electric machines 103, 105 are thus arranged for propelling the vehicle 1, as well as controlling steering of the vehicle 1 as will be described in further detail below.

The vehicle 1 comprises, as described above, the pair of steerable wheels 104, 106 arranged on the front axle 102, the pair of first rear wheels 108, 110 connected to the first rear axle 112, and the pair of second rear wheels 114, 116 connected to the second rear axle 118. The front axle 102 is arranged at a distance l1 from a center of mass 202 of the vehicle, the first rear axle 112 is arranged at a distance l2 from the center of mass 202 of the vehicle, and the second rear axle 118 is arranged at a distance l3 from the center of mass 202 of the vehicle. The center of mass 202 is the position of the vehicle 1 around which the vehicle rotates during the turning maneuver. The center of mass 202 is also the position of the vehicle 1 at which total global forces affecting the vehicle 1 can be expressed. In the following, the x-axis is the axis extending in the longitudinal direction of the vehicle 1, the y-axis is extending in the transversal direction of the vehicle 1 and the z-axis is extending in the vertical direction of the vehicle 1. During the turning maneuver, the vehicle 1 is exposed to a torque Mz at the center of mass 202. Also, the vehicle is exposed to a global longitudinal force Fx and a global lateral force Fy.

Moreover, when the steerable wheels 104, 106 of the front axle 102 is exposed to the steering angle $\delta$, the steerable wheel 104 on the left hand side is exposed to a longitudinal force Fx, 104 and a lateral force Fy, 104, while the steerable wheel 106 on the right hand side is exposed to a longitudinal force Fx, 106 and a lateral force Fy, 106. The sum of the lateral force of the steerable wheels 104, 106 on the left- and right-hand sides can be expressed as a front wheel lateral force. The sum of the front wheel longitudinal forces may be increased/reduced when e.g. propelling the vehicle or braking the vehicle, whereas the differential front wheel forces is used for controlling the steering angle. The steering angle $\delta$ can be obtained by either controlling one of the individually controlled electric machines, or controlling both of the individually controlled electric machines to obtain different wheel speeds.

Furthermore, the pair of first rear wheels 108, 110 is exposed to a respective lateral force Fy, 108 and Fy, 110, and the pair of second rear wheels 114, 116 is exposed to a respective lateral force Fy, 114 and Fy, 116. In the exemplified embodiment of FIG. 2, the longitudinal force of the pair of first rear wheels 108, 110 and the pair of second rear wheels 114, 116 is set to zero, i.e. the respective wheel is not exposed to propulsion or braking.

Turning now to FIG. 3, which is an illustration of the vehicle before entering a curvature 302 of the road, i.e. before the turning maneuver takes place. As can be seen in FIG. 3, the vehicle 1 is currently driving straight ahead at the vehicle speed v. Thus, before entering the curvature 302, the steering angle $\delta$ is zero. The curvature has a radius denoted as $r_{road}$. Hereby, the vehicle may detect the curvature of the road ahead by means of a suitable sensor. According to an example embodiment, the vehicle may comprise a path controller (see FIG. 5) arranged to detect the road ahead, i.e. the upcoming turning maneuver. It should however be understood that the below described system and method may also be implemented during the turning maneuver, i.e. when the turning maneuver takes place. Also, the turning maneuver does not necessarily have to relate to a road curvature as depicted in FIG. 3. On the contrary, the turning maneuver may also relate to e.g. a lane change operation of the vehicle.

Figure 4A:
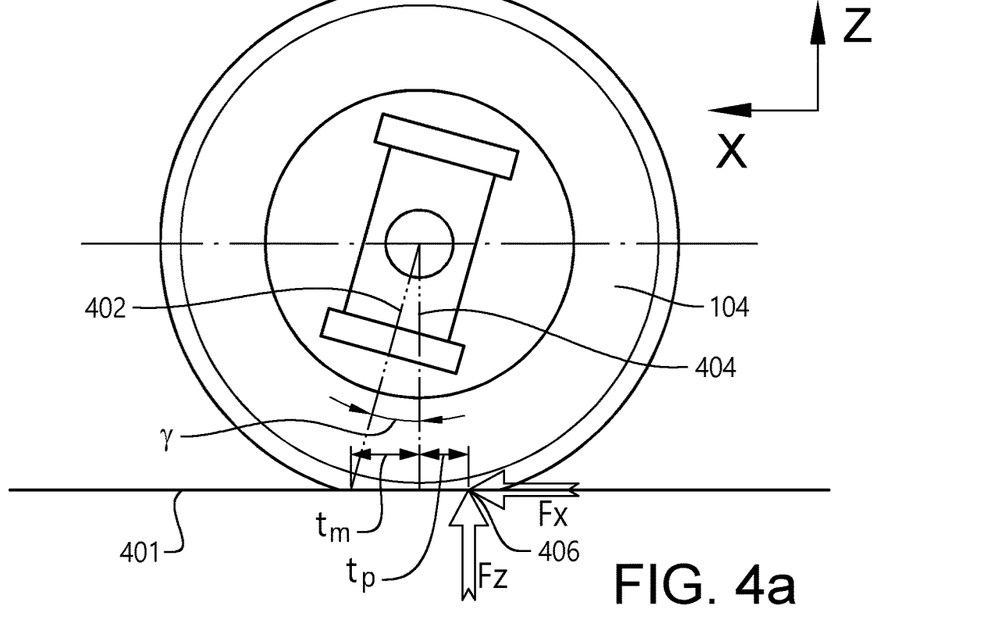
FIG. 4a-4c are different views illustrating one of the front steerable wheels according to an example embodiment.
Figure 4B:
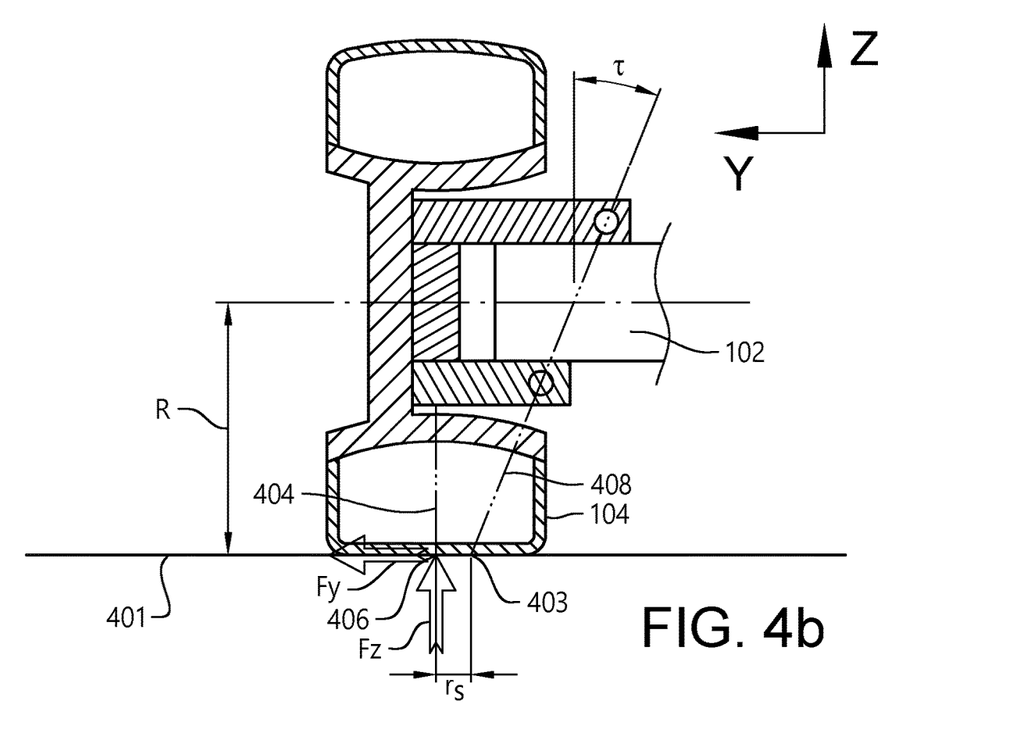
Figure 4C:
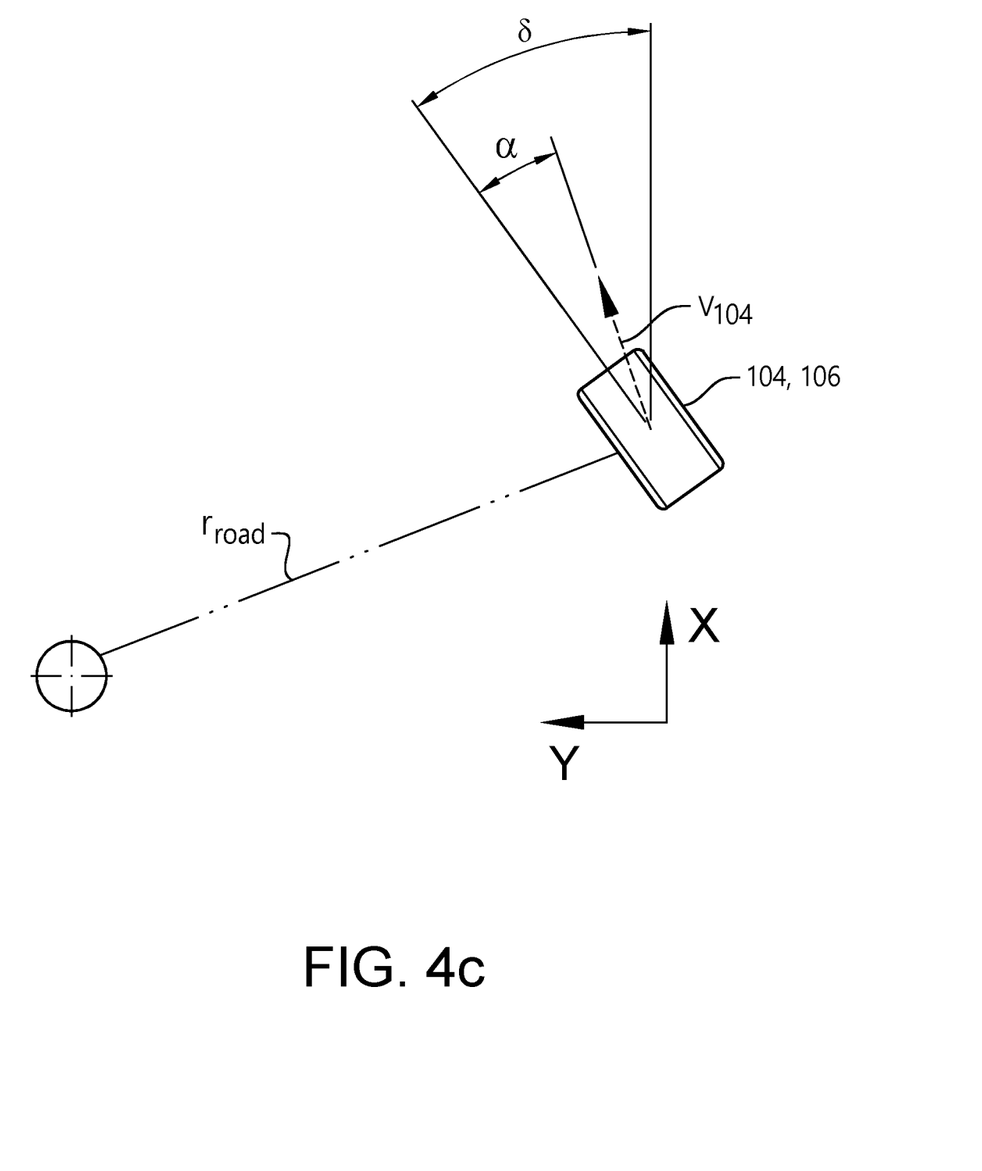

Turning now to FIGS. 4a-4c which illustrate different views of the left steerable wheel 104 according to an example embodiment. In detail, FIG. 4a is a side view of the left steerable wheel 104, FIG. 4b is a rear view of the left steerable wheel 104, and FIG. 4c is a top view of the left steerable wheel 104 during the turning maneuver.

Starting with FIG. 4a, which is a side view of the left steerable wheel 104. The suspension (not shown) of the wheel 104 is arranged such that the wheel 104 is provided with a suspension caster angle γ which is defined as the angular displacement of a steering axis 402 from a vertical axis 404 of the left steerable wheel 104, measured in the longitudinal direction of the vehicle 1. The distance between the intersection of the road surface 401 and the steering axis 402, and the intersection of the road surface 401 and the vertical axis 404 is denoted as $t_m$. With the suspension of the wheel, the point of force application of the contact patch 406 between the wheel 104 and the road surface 401 will be located slightly offset in the longitudinal direction from the intersection of the road surface 401 and the vertical axis 404. This offset is denoted as $t_p$. The contact patch is thus the area of the tire in contact with the ground surface. The point of force application of the contact patch 406 between the wheel 104 and the road surface 401 is dependent on the suspension caster angle γ.

Turning to FIG. 4b, which is a rear view of the left steerable wheel 104. As can be seen, the effective wheel radius R is indicated as the distance between the front axle 102 and the road surface 401, and the wheel 104 is connected to the suspension by an inclined king pin axis 408, which inclination is indicated as T. Thus, the wheel 104 is rotated around the king pin axis 408 during the turning maneuver. Furthermore, the point of force application of the contact patch 406 between the wheel 104 and the road surface 401 is located at the intersection between the vertical axis 404 and the road surface 401. The vehicle 1, and in particular the steerable wheels 104, 106 are provided with a positive wheel suspension scrub radius $r_s$. The wheel suspension scrub radius $r_s$ is defined as the distance between the point of force application of the contact patch 406 and the intersection 403 between the king pin axis 408 and the road surface 401. A positive wheel suspension scrub radius $r_s$ is generated when the intersection between the king pin axis 408 and the road surface 401 is located on an inner side of the vertical axis 404 as seen in the longitudinal direction depicted in FIG. 4b. When e.g. decelerating the individually controllable electric machine 103 of the left steerable wheel 104, the wheel will rotate around the king pin axis 408 due to the positive scrub radius $r_s$ causing the vehicle to turn to the left. Hereby, an additional steering torque $M_{steer}$ can be generated.

Turning to FIG. 4c, which is a simplified illustration of a combined left and right front wheel seen from above. In FIG. 4c, a differential wheel speed of the left 103 and right 105 individually controllable electric machines is provided for causing the vehicle to turn to the left. In particular, an increased wheel speed on the right-hand side wheel is provided compared to the wheel speed of the left-hand side wheel to cause the vehicle to turn left. As can be seen, the vehicle 1 is operated at the road curvature described above in relation to FIG. 3, where the road curvature has the radius $r_{road}$. The steerable wheel 104 thus has a steering angle δ. However, the steerable wheel 104 will move at a speed v in the direction a relative to the steering angle δ. This angle α is referred to as a slip angle α.

The front wheel lateral force may be determined by determining the slip angle of the steerable wheels for the turning maneuver. In particular, the front wheel lateral force can be determined based on a cornering stiffness of the steerable wheels and the slip angle. The slip angle should thus be construed as an angle defining the difference between angular position of the wheel and the actual angular direction of movement of the wheel. For example, if the steerable wheels are steered 15 degrees relative to a longitudinal axis, but the actual movement of the steerable wheels is 12 degrees relative to the same longitudinal axis, then the slip angle is 3 degrees. The cornering stiffness of the tires on the other hand is the stiffness of the steerable wheels in the lateral direction. The cornering stiffness is a tire parameter defined as a factor between the slip angle (or side slip angle) and lateral tire force. The cornering stiffness may be considered constant for small slip angles, for a given tire at a given normal load.

By means of the above description, it is possible to control the motion of the vehicle by determining the required steering angle for operating the vehicle at the specific road curvature, and to compare such required steering angle with an actual steering angle. Also, in order to determine the most power efficient mode of operating the vehicle during the turning maneuver, a first power utilization value is compared to a second power utilization value. In further detail, the first power utilization value is a value defining the power efficiency of operating the vehicle during the turning maneuver by controlling the individually controllable electric machines, while the second power utilization value is a value defining the power efficiency of operating the vehicle during the turning maneuver by controlling the power steering system.

Parameters described above will not be given any further detailed description unless indicated. The wheel speed, and in turn the wheel torque can be determined by determining a required differential longitudinal force ΔFx, which is the difference between Fx, 104 and Fx, 106, and the wheel radius R.

According to a non-limiting example, the first power utilization value can be determined to be greater than the second power utilization value when individually controllable electric machines are able to generate a sufficient steering torque $M_{steer}$, such that the vehicle sufficiently follows curvature during the turning maneuver. Hence, the steering torque $M_{steer}$ is sufficient to obtain the required steering angle. The required steering torque $M_{steer}$ can be determined according to:

$$M_{steer} = \Delta F_x \cdot r_s = (F_{y,104} + F_{y,106}) \cdot t \quad (1)$$

where:
$F_{y,\,104}$ and $F_{y,\,106}$ = the front wheel lateral force of the steerable wheels 104, 106

$$t = t_m + t_p$$

Equation (1) can be rewritten according to:

$$M_{steer} = -2C_\alpha \cdot \alpha \cdot (t_m + t_p) \quad (2)$$

where:
$C_\alpha$ = lateral stiffness of the tire;
$F_{y,i} = C_\alpha \cdot \alpha$ = the front wheel lateral force; and $$\alpha = \left(\delta - \frac{l_1}{v}\omega\right) \quad (3)$$

where
v = the longitudinal vehicle speed; and
ω = rotational speed of the vehicle during the turning maneuver.

Furthermore, the global vehicle torque $M_z$ at the center of rotation 202 can be determined according to:

$$M_z = l_1((F_{x,104} + F_{x,106}) \cdot \delta + 2C_\alpha \cdot \alpha) + \frac{w}{2}(-F_{x,104} + F_{x,106}) - \quad (4)$$

$$2C_\alpha \cdot l_2^2 \cdot \frac{\omega}{v} + \frac{w}{2} \cdot (-F_{x,108} + F_{x,110}) - 2C_\alpha \cdot l_3^2 \cdot \frac{\omega}{v} + \frac{w}{2} \cdot (-F_{x,114} + F_{x,116})$$

where:

$\Delta F_x = F_{x,104} - F_{x,106}$ $F_{x,108} = F_{x,110} = F_{x,114} = F_{x,116} = 0$ $\beta = 0$ $w$ = track width of the vehicle where $\beta$ is the side slip angle of the vehicle. Hereby, an assumption is made that the velocity is pointing in the same direction as the longitudinal axis of the vehicle.

Furthermore, the slip angle of the steerable wheels can be determined according to:

$$(F_{x,104} - F_{x,106}) \cdot r_s + (F_{y,104} + F_{y,106}) \cdot (t_m + t_p) = D\dot{\alpha} - J\ddot{\alpha} \quad (5)$$

$$F_y = F_{y,104} + F_{y,106} = 2 \cdot C_\infty \cdot \alpha \quad (6)$$

$$\Delta F_x \cdot r_s + 2C_\alpha \cdot \alpha \cdot (t_m + t_p) = D\dot{\alpha} - J\ddot{\alpha} \quad (7)$$

For a steady state operation: $\dot{\alpha} = \ddot{\alpha} = 0$:

$$\Delta F_x = \frac{2C_\alpha \cdot \alpha \cdot (t_m + t_p)}{r_s} \quad (8)$$

$$\alpha = \frac{\Delta F_x \cdot r_s}{2C_\alpha \cdot (t_m + t_p)} \quad (9)$$

Furthermore, with the assumption that $$r_{road} \approx \frac{v}{\omega}$$

and $t = t_m \mp t_p$, the following expressions can be made:

$$0 = -\Delta F_x \cdot \left(\frac{l_1 \cdot r_s}{t} + \frac{\omega}{2}\right) - 2C_\alpha \cdot \alpha\left(\frac{1}{r_{road}} \cdot (l_2^2 + l_3^2)\right) \quad (10)$$

$$\Rightarrow \Delta F_x = 2C_\alpha \cdot \alpha \frac{-\frac{1}{r_{road}} \cdot (l_2^2 + l_3^2)}{\frac{l_1 \cdot r_s}{t} + \frac{\omega}{2}} \quad (11)$$

Hereby, the differential wheel torque of the steerable wheels can be determined based on the effective wheel radius R.

The above may be controlled by assigning control allocations, whereby the following expression can be formulated:

$$u_{opt} = \underset{u_{min} \le u \le u_{min}}{\arg\min} \left[\|W_u(u - u_d)\|_2^2 + \gamma\|W_v(Bu - v)\|_2^2\right] \quad (12)$$

where:

$$v = Bu \quad (13)$$

in which the following matrices and vectors are defined as $$\begin{bmatrix} F_x \\ F_y \\ M_z \\ M_{steer} \end{bmatrix} = \begin{bmatrix} \frac{1}{R} & \frac{1}{R} & \frac{1}{R} & \frac{1}{R} & \frac{1}{R} & \frac{1}{R} & 0 \\ 0 & 0 & 0 & 0 & 0 & 0 & 2C_\alpha \\ -\frac{w_1}{2R} & \frac{w_1}{2R} & -\frac{w_2}{2R} & \frac{w_2}{2R} & -\frac{w_3}{2R} & \frac{w_3}{2R} & l_1 * 2C_\alpha \\ -\frac{r_s}{R} & \frac{r_s}{R} & 0 & 0 & 0 & 0 & 0 \end{bmatrix} \begin{bmatrix} T_{104} \\ T_{106} \\ T_{108} \\ T_{110} \\ T_{114} \\ T_{116} \\ \delta \end{bmatrix} \quad (14)$$

wherein:

R is the effective radius; and

T is the wheel torque for the respective wheel.

If the power steering system is deactivated, the steering angle $\delta$ can be set to the actual value of the steering angle, i.e. $\delta_{actual}$. Hence, during a steering maneuver, capabilities for the steering actuator is substantially limited to the actual steering angle.

Figure 5:
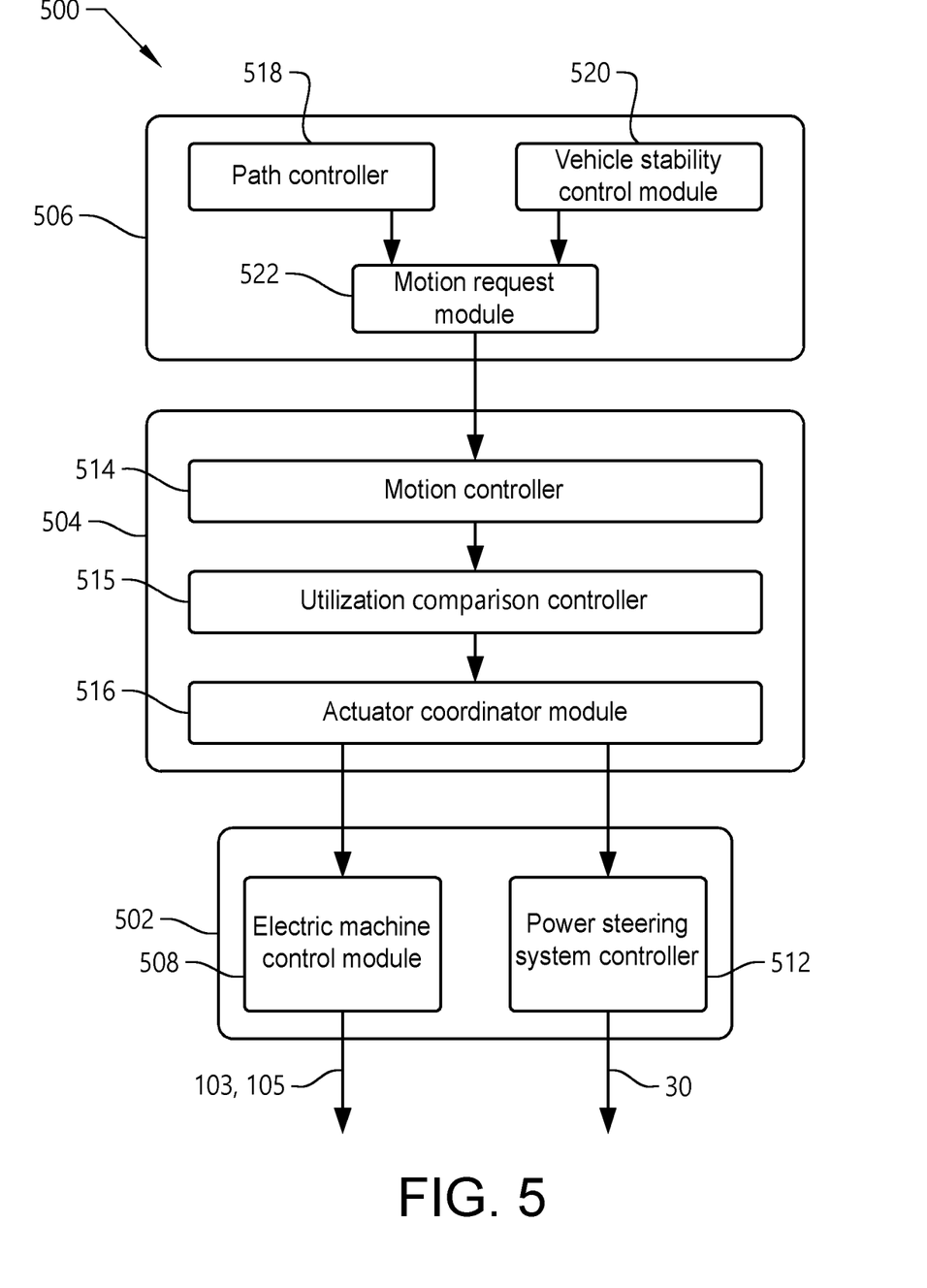
FIG. 5 is a schematic illustration of a steering system according to an example embodiment.

Reference is now made to FIG. 5, which illustrates the steering system 500 according to an example embodiment. As can be seen in FIG. 5, the steering system 500 comprises an actuator control module 502, a vehicle motion control module 504 and a traffic situation controller 506. The actuator control module 502 comprises an electric machine control module 508 and a power steering system controller 512. The vehicle motion control module 504 comprises a motion controller 514, a utilization comparison controller 515 and an actuator coordinator module 516. Finally, the traffic situation controller 506 comprises a path controller 518, a vehicle stability control module 520 and a motion request module 522.

During operation of the exemplified system 500 in FIG. 5, the path controller 518 detects an upcoming path for the vehicle 1 and transmits a steering angle $\delta_{path}$ required to maintain the path to the motion request module 522. The signal is based on path curvature, and in some implementation on vehicle speed. Furthermore, the vehicle stability control module 520 transmits a maximum allowable rotational velocity for the vehicle at the upcoming path to the motion request module 522. The motion request module 522 evaluates the received signals and transmits a requested steering angle $\delta_{ref}$, a requested rotational velocity $\omega_{req}$, and a requested longitudinal vehicle acceleration $a_{x,\,req}$ to the motion controller 514.

The motion controller 514 evaluates the received parameters and transmits a vector comprising a longitudinal vehicle force $F_x$, lateral vehicle force $F_y$, global vehicle torque $M_z$, as well as the above described additional steering torque $M_{steer}$. The utilization comparison controller 515 thereafter determines if the power utilization of the vehicle 1, by controlling steering using the individually controllable electric machines during the turning maneuver, is better compared to the power utilization by controlling steering using the power steering system. Thus, a first power utilization value of the vehicle arrangement obtained by operating the individually controllable electric machines is compared to a second power utilization value of the vehicle arrangement obtained by operating the power steering system to obtain the steering angle.

It may be determined that at least one of the individually controllable electric machines 103, 105 is able to regenerate electrical power to the electrical power supply during the turning maneuver. In such case, the utilization comparison controller 515 can determine that the first power utilization value is higher than the second power utilization value. Preferably, the state of charge level of the electrical power supply 200 should be at such level as to be able to receive electrical power. According to another alternative, the utilization comparison controller 515 may determine that the first power utilization value is higher than the second power utilization value when the individually controllable electric machines are solely able to sufficiently control the vehicle to obtain the required steering angle during the turning maneuver. In such case, the operational capacity of the power steering system can be reduced, such as preferably be deactivated and, for example, control systems such as hydraulic systems, pneumatic systems or electrical systems connected to the power steering system can be deactivated whereby the overall power utilization of the vehicle increases.

The utilization comparison controller 515 transmits a signal to the actuator coordinator module 516 with information relating to the best option for controlling the steering of the vehicle during the turning maneuver. Based on the received signal from the utilization comparison controller 515, the actuator coordinator module 516 transmits signals to one or more of the electric machine control module 508 and/or the power steering system controller 512. In detail, the actuator coordinator module 516 receives a signal for determining to control steering of the vehicle using the individually controllable electric machines and/or the power steering system. If the first power utilization value is equal to, or greater than the second power utilization value, the actuator coordinator module 516 transmits a control signal to the electric machine control module 508 to control steering of the vehicle 1 using the individually controllable electric machines 103, 105. However, if the second power utilization value is greater than the first power utilization value, the actuator coordinator module 516 transmits a control signal to the power steering system controller 512 to control steering of the vehicle 1 using the power steering system. In a case where the operating conditions are such that the individually controllable electric machines 103, 105 are unable to solely obtain the required steering angle during the turning maneuver, the actuator coordinator module 516 can transmit a control signal to the electric machine control module 508 as well as to the power steering system controller 512. Hereby, steering of the vehicle 1 during the turning maneuver is controlled by the individually controllable electric machines 103, 105 as well by the power steering system. When controlling steering using the individually controllable electric machines, the optimization of the steering system is preferably restricted to a steering angle corresponding the actual steering angle as also described above. Hence, the operational capacity of the power steering system is reduced, preferably deactivated and unable to control the steering angle.

Figure 6:
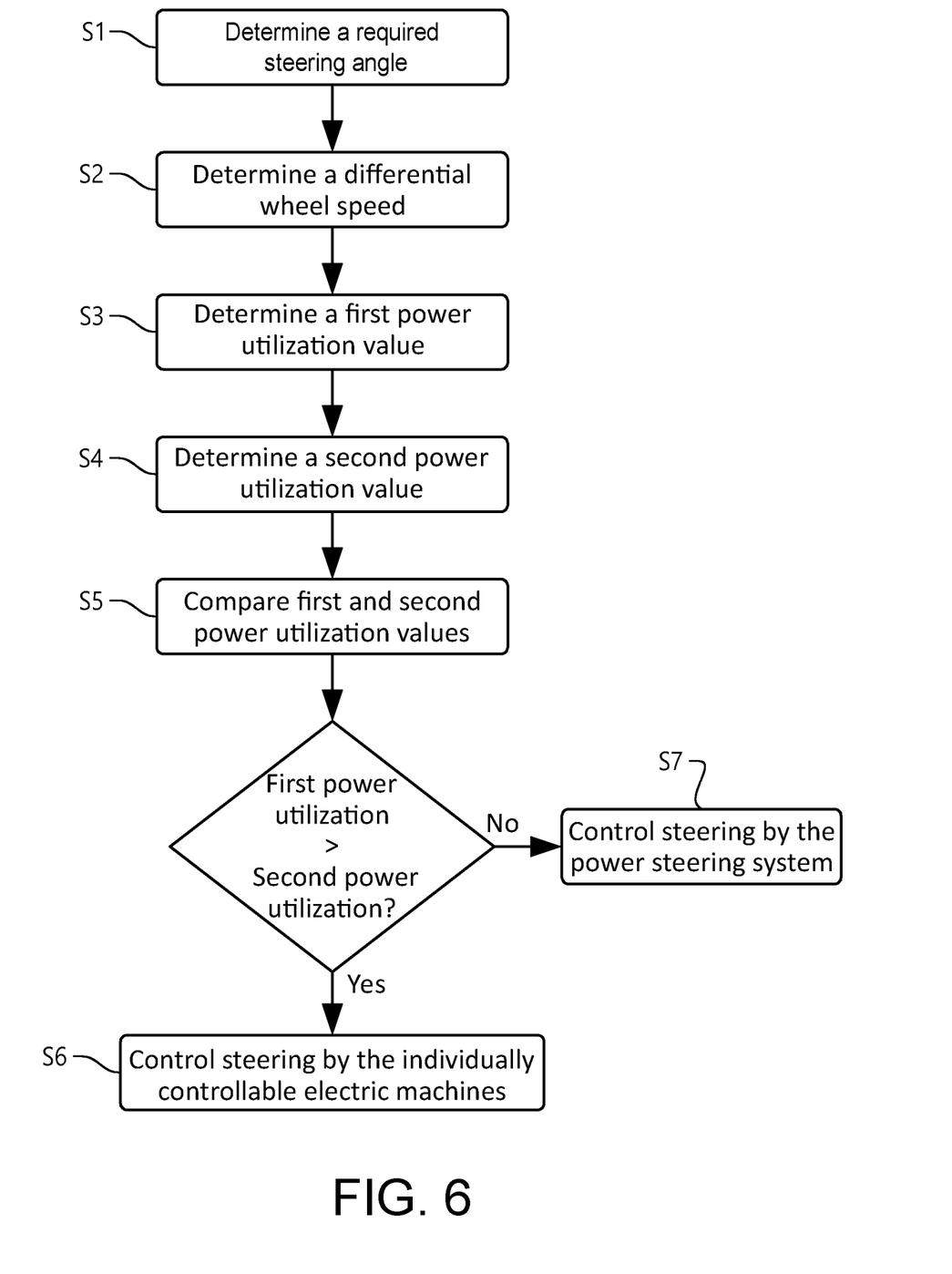
FIG. 6 is a flow chart of a method for controlling a steering system according to an example embodiment.

In order to sum up, reference is made to FIG. 6, which is a flow chart of a method for controlling the steering system 500 according to an example embodiment. During operation, a required steering angle $\delta_{req}$ for operating the vehicle during a turning maneuver is determined S1. A differential wheel speed, for the individually controllable electric machines, required for obtaining the required steering angle $\delta_{req}$ is determined S2. The required steering angle $\delta_{req}$ can be determined in advance based on a signal received from e.g. a path follower or from an operator turning the steering wheel. A first power utilization value of the vehicle arrangement 1 obtained by operating the individually controllable electric machines with the differential wheel speed is determined S3. Various options for determining the first power utilization value are described above. In order to determine if it is power efficient to control the steering using the individually controllable electric machines 103, 105, also a second power utilization value of the vehicle arrangement obtained by operating the power steering system to obtain the steering angle is determined S4.

The first and second power utilization values are thereafter compared to each other. When the first power utilization value is equal to, or greater than the second power utilization value, the steering of the vehicle arrangement 1 during the turning maneuver is controlled S6 by applying the differential wheel speed by at least one of the individually controllable electric machines and reducing the operational capacity of the power steering system. However, when the second power utilization value is greater than the first power utilization value, steering of the vehicle arrangement 1 during the turning maneuver is controlled S7 by controlling the power steering system, either alone or in combination with the individually controllable electric machines 103, 105.

It is to be understood that the present disclosure is not limited to the embodiments described above and illustrated in the drawings; rather, the skilled person will recognize that many changes and modifications may be made within the scope of the appended claims.

The invention claimed is:

1. A method for controlling steering of a vehicle arrangement, the vehicle arrangement comprising a power steering system for steer control of a pair of steerable wheels arranged on a left- and right-hand side of the vehicle arrangement; wherein each of the steerable wheels comprises an individually controllable electric machine for propelling the vehicle arrangement, the method comprising the steps of:
   determining a required steering angle for operating the vehicle arrangement during a turning maneuver;
   determining, for the individually controllable electric machines, a differential wheel speed required for obtaining the required steering angle;
   determining a first power utilization value of the vehicle arrangement obtained by operating the individually controllable electric machines with the differential wheel speed;
   determining a second power utilization value of the vehicle arrangement obtained by operating the power steering system to obtain the steering angle;
   comparing the first power utilization value with the second power utilization value; and
   controlling steering of the vehicle arrangement during the turning maneuver, by applying the differential wheel speed using at least one of the individually controllable electric machines and reducing the operational capacity of the power steering system, when the first power utilization value is equal to, or greater than the second power utilization value.

2. The method of claim 1, wherein the power steering system is deactivated during the step of reducing its operational capacity.

3. The method of claim 1, further comprising the steps of:
   determining if the vehicle is able to operate the turning maneuver with the required steering angle by controlling at least one of the individually controllable electric machines; and
   determining that the first power utilization value is greater than the second power utilization value when being able to operate the vehicle with the required steering angle using at least one of the individually controllable electric machines.

4. The method of claim 1, wherein the individually controllable electric machines are electrically connected to an electrical power supply, wherein the step of determining the first power utilization value comprises:
receiving a signal indicative of a current state of charge level for the electrical power supply;
determining, based on the current state of charge level, an electrical power level regenerable by at least one of the individually controlled electric machines during the turning maneuver; and
determining the first power utilization value at least in part on the regenerable electrical power level.

5. The method of claim 4, wherein steering of the vehicle arrangement is controlled by operating the at least one individually controlled electric machine to regenerate electrical power when the current state of charge level is below a predetermined threshold level.

6. The method of claim 5, further comprising the step of:
receiving a signal indicative of a deceleration during the turning maneuver; and
operating the at least one electric machine to regenerate electrical power when the vehicle will decelerate during the turning maneuver.

7. The method of claim 5, wherein steering of the vehicle is controlled by operating one of the individually controlled electric machines to regenerate electrical power, and operating the other one of the individually controlled electric machines to increase the wheel speed during the turning maneuver.

8. The method of claim 1, further comprising the steps of:
determining a desired acceleration level for operating the vehicle arrangement during the turning maneuver;
determining a wheel friction value for each of the steerable wheels, the wheel friction value being a friction value between the wheel and a road surface; and
controlling the differential wheel speed based on the desired acceleration level and the wheel friction values.

9. The method of claim 8, wherein the desired acceleration level is determined based on an input signal indicative of a position of an acceleration pedal.

10. The method of claim 8, wherein the desired acceleration level is determined based on a desired vehicle speed and an upcoming road trajectory.

11. The method of claim 1, further comprising the steps of:
determining a desired vehicle speed during the turning maneuver;
determining a differential wheel speed for steering the vehicle at the desired vehicle speed during the turning maneuver;
comparing the differential wheel speed with a maximum available differential wheel speed obtainable by the individually controllable electric machines; and
controlling steering of the vehicle arrangement during the turning maneuver, by applying a differential wheel speed by the individually controllable electric machines and activating the power steering system, for obtaining a desirable steering radius and vehicle speed.

12. The method of claim 1, further comprising the steps of:
determining a desired deceleration level of the vehicle arrangement during the turning maneuver;
determining a maximum available deceleration level obtainable by the individually controllable electric machines; and
applying a service brake of the vehicle arrangement during the turning maneuver when the maximum available deceleration level is lower compared to the desired deceleration level.

13. The method of claim 1, wherein steering of the vehicle arrangement is controlled by applying the differential wheel speed by the individually controllable electric machines and reducing the operational capacity of the power steering system when the vehicle speed is above a predetermined speed threshold level.

14. The method of claim 1, wherein the power steering system is one of a hydraulically controlled steering system, a pneumatically controlled steering system or a steer-by-wire steering system.

15. A computer program comprising program code means for performing the steps of claim 1 when the program is run on a computer.

16. A computer readable medium carrying a computer program comprising program means for performing the steps of claim 1 when the program means is run on a computer.

17. A control unit connectable to a vehicle arrangement comprising a pair of steerable wheels arranged on a left- and right-hand side of the vehicle arrangement, power steering system for steer control of the pair of steerable wheels; wherein each of the steerable wheels comprises an individually controllable electric machine for propelling the vehicle arrangement, wherein the control unit is electrically connectable to the pair of steerable wheels and the power steering system, the control unit being configured to:
determine a required steering angle for operating the vehicle arrangement during a turning maneuver;
determine, for the individually controllable electric machines, a differential wheel speed required for obtaining the required steering angle;
determine a first power utilization value of the vehicle arrangement obtained by operating the individually controllable electric machines with the differential wheel speed;
determine a second power utilization value of the vehicle arrangement obtained by operating the power steering system to obtain the steering angle; and
compare the first power utilization value with the second power utilization value; and when the first power utilization value is equal to, or greater than the second power utilization value, the control unit is further configured to:
transmit a control signal to the individually controllable electric machines, the control signal being indicative of applying the differential wheel speed; and
transmit a control signal to the power steering system for reducing the operational capacity thereof.

* * * * *